(12) United States Patent
Park

(10) Patent No.: US 8,310,618 B2
(45) Date of Patent: Nov. 13, 2012

(54) IMAGE DISPLAY APPARATUS AND METHOD OF MANUFACTURING THE SAME WITH A SLIM THICKNESS

(75) Inventor: Dong Wook Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/006,660

(22) Filed: Jan. 14, 2011

(65) Prior Publication Data

US 2011/0199288 A1 Aug. 18, 2011

(30) Foreign Application Priority Data

Jan. 15, 2010 (KR) .................. 10-2010-0004115

(51) Int. Cl.
*G02F 1/1333* (2006.01)
*G02F 1/1335* (2006.01)

(52) U.S. Cl. ................ 349/58; 349/61; 349/65; 349/71; 428/447; 257/99

(58) Field of Classification Search .................. 349/71, 349/58, 61–65; 362/249, 227; 428/447; 257/99
See application file for complete search history.

(56) References Cited

U.S. PATENT DOCUMENTS

| 7,714,341 | B2* | 5/2010 | Chil Keun et al. | 257/98 |
|---|---|---|---|---|
| 2005/0001225 | A1* | 1/2005 | Yoshimura et al. | 257/98 |
| 2005/0007516 | A1 | 1/2005 | Hong et al. | 349/64 |
| 2006/0186430 | A1 | 8/2006 | Park et al. | 257/100 |
| 2008/0006837 | A1* | 1/2008 | Park et al. | 257/98 |
| 2008/0137331 | A1 | 6/2008 | Kaneko et al. | 362/231 |
| 2009/0236620 | A1* | 9/2009 | Park et al. | 257/89 |
| 2009/0268434 | A1 | 10/2009 | Mita et al. | 362/97.1 |
| 2010/0027261 | A1* | 2/2010 | Yashima et al. | 362/249.02 |
| 2010/0078657 | A1* | 4/2010 | Nagai | 257/88 |
| 2010/0123855 | A1* | 5/2010 | Shin | 349/61 |
| 2010/0134017 | A1* | 6/2010 | Yatsuda et al. | 315/113 |
| 2010/0195322 | A1* | 8/2010 | Kawakami et al. | 362/231 |
| 2010/0244662 | A1* | 9/2010 | Uemoto et al. | 313/501 |
| 2011/0031874 | A1* | 2/2011 | Hosokawa et al. | 313/503 |

FOREIGN PATENT DOCUMENTS

| JP | 2001-42782 A | 2/2001 |
|---|---|---|
| KR | 10-2005-0005675 A | 1/2005 |
| KR | 10-0587017 B1 | 6/2006 |
| KR | 10-2007-0078914 A | 8/2007 |

(Continued)

OTHER PUBLICATIONS

European Search Report dated Jun. 8, 2011 issued in Application No. 11 15 0789.

(Continued)

*Primary Examiner* — Huyen Ngo

(74) *Attorney, Agent, or Firm* — KED & Associates, LLP

(57) ABSTRACT

Disclosed are an image display apparatus and a method of manufacturing the same. The image display apparatus includes a display panel displaying an image, a light supplying sheet provided under the display panel and supplying light to the display panel, an attaching unit attaching the light supplying sheet on the display panel, and a reflective layer under the light supplying sheet. The light supplying sheet includes a support member, a transparent conductive layer on the support member, and a plurality of light emitting devices on the transparent conductive layer.

20 Claims, 3 Drawing Sheets

FOREIGN PATENT DOCUMENTS

| | | |
|---|---|---|
| KR | 10-2008-0042685 A | 5/2008 |
| KR | 10-2008-0061568 A | 7/2008 |
| KR | 10-2009-0060543 A | 6/2009 |

OTHER PUBLICATIONS

Korean Office Acted Jul. 15, 2011 issued in Application No. 10-2010-0004115.

Korean Office Action dated Mar. 4, 2011 issued in Application No. 10-2010-0004115.

\* cited by examiner

IMAGE DISPLAY APPARATUS AND METHOD OF MANUFACTURING THE SAME WITH A SLIM THICKNESS

CROSS-REFERENCE TO RELATED APPLICATION

This application claims priority to Korean Patent Application No. 10-2010-0004115, filed Jan. 15, 2010, which is hereby incorporated by reference in its entirety.

BACKGROUND

The embodiment relates to an image display apparatus and a method of manufacturing the same.

The image display apparatus includes a liquid crystal panel and a backlight unit installed on a rear surface of the liquid crystal panel to supply light to the liquid crystal panel. The backlight unit may include a lamp or an LED (light emitting diode) as a light source.

Meanwhile, a slim LCD (Liquid Crystal Display) has been demanded from customers in an LCD market. In addition, a scheme to reduce the manufacturing cost by simplifying the manufacturing process has been requested.

BRIEF SUMMARY

The embodiment provides a liquid crystal display capable of reducing the manufacturing cost and being realized in slim size and a method of manufacturing the same.

According to the embodiment, an image display apparatus includes a display panel displaying an image, a light supplying sheet provided under the display panel and supplying light to the display panel, an attaching unit attaching the light supplying sheet on the display panel, and a reflective layer under the light supplying sheet. The light supplying sheet includes a support member, a transparent conductive layer on the support member, and a plurality of light emitting devices on the transparent conductive layer.

According to the embodiment, a method of manufacturing an image display apparatus includes preparing a light supplying sheet, attaching the light supplying sheet on a display panel, and forming a reflective layer under the light supplying sheet. The preparing of the light supplying sheet includes forming a transparent conductive layer on a support member, and forming a plurality of light emitting devices on the transparent conductive layer.

DETAILED DESCRIPTION OF THE EMBODIMENTS

Hereinafter, a light emitting device, a light emitting device package, and a lighting system including the same according to the embodiment will be described with reference to accompanying drawings.

In the description of embodiments, it will be understood that when a layer (or film) is referred to as being 'on' another layer or substrate, it can be directly on another layer or substrate, or intervening layers may also be present. Further, it will be understood that when a layer is referred to as being 'under' another layer, it can be directly under another layer, and one or more intervening layers may also be present. In addition, it will also be understood that when a layer is referred to as being 'between' two layers, it can be the only layer between the two layers, or one or more intervening layers may also be present.

Figure 1:
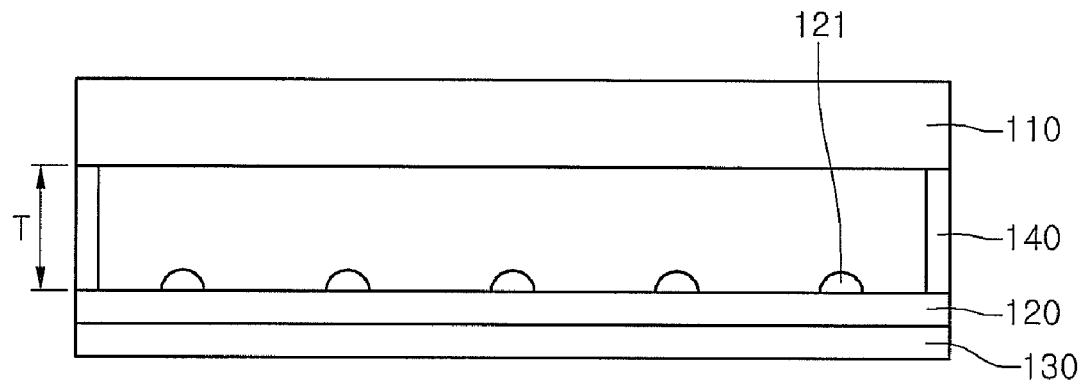
FIG. 1 is a sectional view showing a liquid crystal display according to one embodiment of the present invention.
Figure 2:
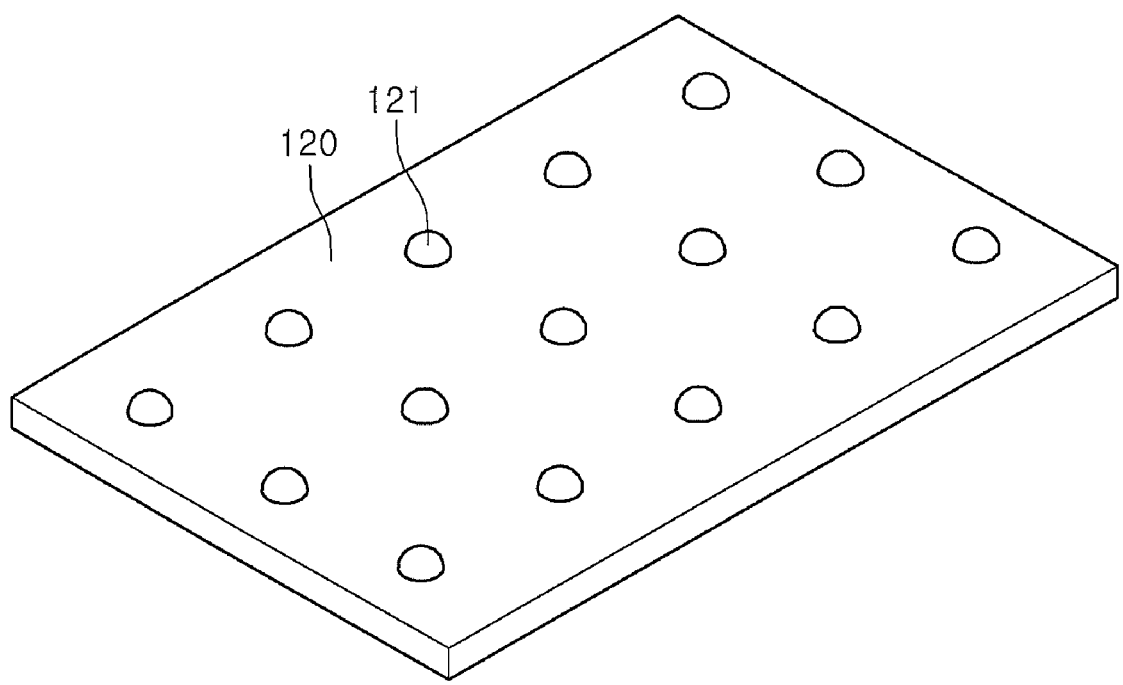
FIGS. 2 and 3 are views showing that the light emitting device is provided on a light supplying sheet according to one embodiment of the present invention.
Figure 3:
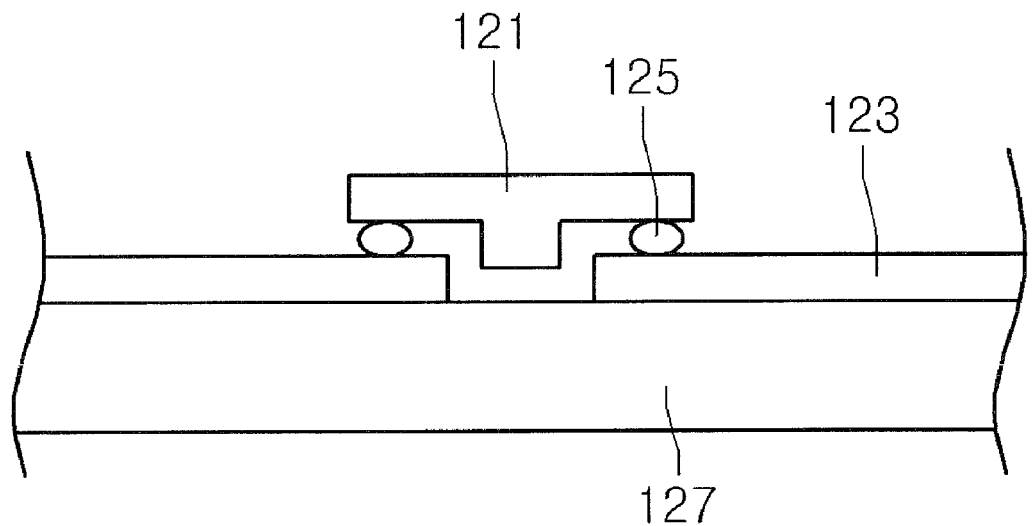

FIG. 1 is a sectional view showing an LCD (liquid crystal display) according to the embodiment, and FIGS. 2 and 3 are views showing that a light emitting device is provided on a light supply sheet according to the embodiment.

The LCD according to the embodiment includes a liquid crystal display panel 110, a light supplying sheet 120, and a reflective layer 130.

The light supplying sheet 120 may be provided under the liquid crystal display panel 110. A plurality of light emitting devices 121 may be provided on the light supplying sheet 120. The light emitting devices 121 provided on the light supplying sheet 120 may supply light to the liquid crystal display panel 110.

The reflective layer 130 may be provided under the light supplying sheet 120. For instance, the reflective layer 130 may include at least one selected from the group consisting of W, ITO, Cr, Al and Ag. The reflective layer 130 may be provided with a separate layer. The reflective layer 120 may be formed on a bottom surface of the light supplying sheet 120 by using deposition or coating. The reflective layer 130 may reflect light emitted from the light emitting devices 121 to the liquid crystal display panel 110.

The light supplying sheet 120 may include a support member 127, a transparent conductive layer 123 provided on the support member 127, and the light emitting devices 121 provided on the transparent conductive layer 123.

The support member 127 may include a flexible substrate. The support member 127 may include transparent glass or plastic. The transparent conductive layer 123 may include a transparent conductive oxide layer.

The light emitting device 121 may include a light emitting diode. The light emitting device 121 may be connected to the transparent conductive layer 123 through a flip-chip scheme. The transparent conductive layer 123 may be formed on the support member 127. The transparent conductive layer 123 may supply power to the light emitting device 121, and may be patterned on the support member 127 in a predetermined shape. The light emitting device 121 may be connected to the transparent conductive layer 123 by using a bump 125. The light emitting device 121 may be connected to the transparent conductive layer 123 through a die-bonding scheme or a wire-bonding scheme.

The light emitting device 121 may include a red light emitting device, a green light emitting device, or a blue light emitting device. The light emitting device 121 may include a white light emitting device or an UV light emitting device. Accordingly, the light emitting device 121 may supply white light to the liquid crystal panel 110.

The liquid crystal display panel 110 may be attached to the light supplying sheet 120 by an attaching unit 140. For instance, the attaching unit 140 may be selected from the group consisting of a silicon adhesive, an epoxy adhesive and a tape.

According to the LCD of the embodiment, a backlight unit has no need to be additionally manufactured. In addition, the light supplying sheet 120 may supply light to the liquid crystal display panel 110 to display an image. The light supplying sheet 120 may be directly attached to the liquid crystal display panel 110 by the attaching unit 140. The light supplying sheet 120 may have the thickness in the range of about 0.25 mm to about 0.35 mm. Therefore, the thickness from the bottom surface of the support member 127 of the light supplying sheet 120 to the bottom surface of the liquid crystal display panel 110 may be about 0.5 mm or less.

An optical sheet may be disposed between the light supplying sheet 120 and the liquid crystal display panel 110 if necessary. The optical sheet may include a diffusion sheet, a prism sheet, or a DBEF (Dual Brightness Enhancement Film).

Figure 4:
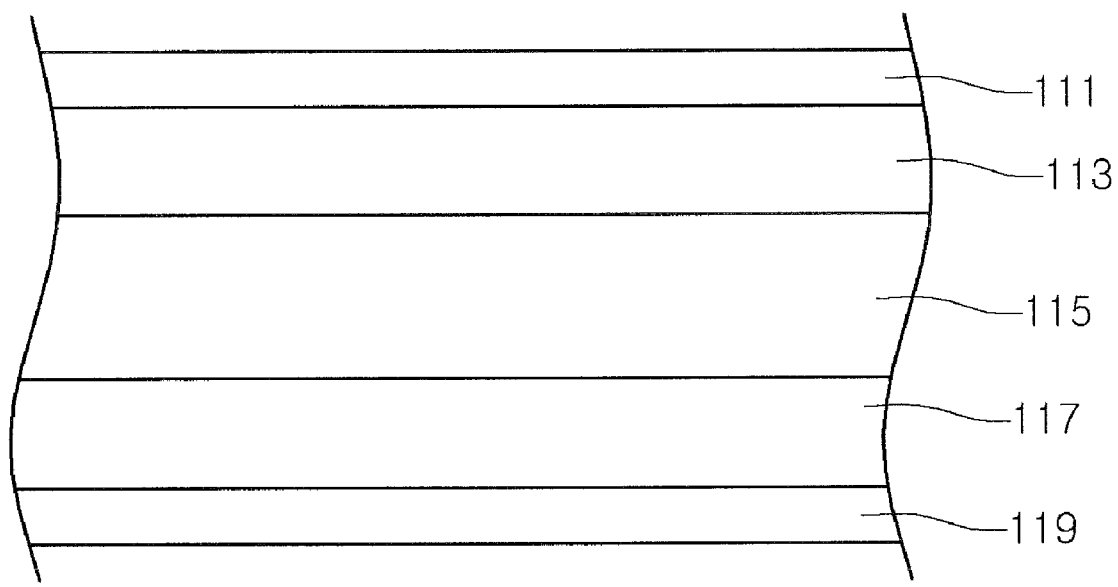
FIG. 4 is a sectional view showing a liquid crystal panel of the LCD according to the embodiment of the present invention.

FIG. 4 is a sectional view showing the liquid crystal display panel 110 of the LCD according to the embodiment.

The liquid crystal display panel 110 may include a first polarizer 111, a color filter substrate 113, a liquid crystal layer 115, a thin film transistor substrate 117, and a second polarizer 119. The color filter substrate 113 may be provided under the first polarizer 111. The second polarizer plate 119 may be provided under the thin film transistor substrate 117. The liquid crystal layer 115 may be disposed between the color filter substrate 113 and the thin film transistor substrate 117. A polarizing axis of the first polarizer 111 may be perpendicular to that of the second polarizer 119.

Figure 5:
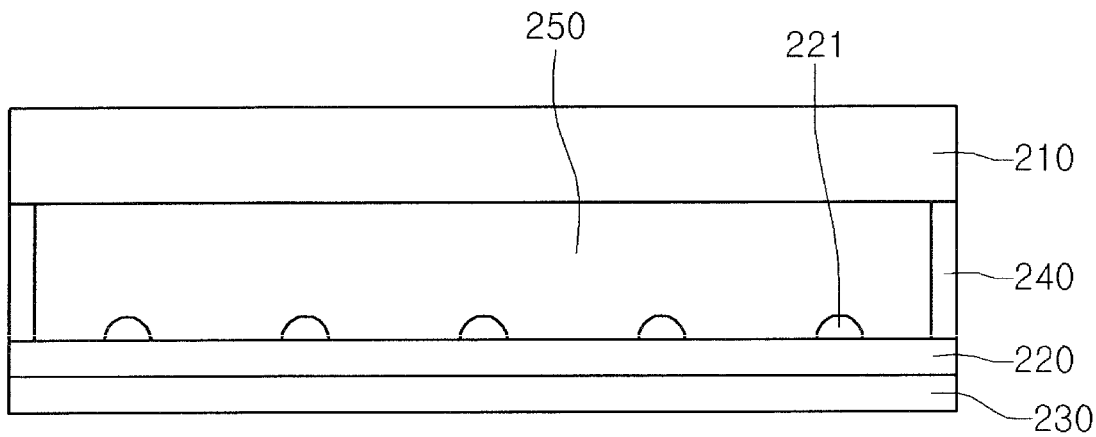
FIG. 5 is a sectional view showing a liquid crystal display according to another embodiment of the present invention.

FIG. 5 is a sectional view showing an LCD according to another embodiment.

The LCD according to the embodiment includes a liquid crystal panel 210 to display an image, a light supplying sheet 220, a reflective layer 230, an attaching unit 240, and a resin member 250.

The light supplying sheet 220 may be provided under the liquid crystal panel 210. A plurality of light emitting devices 221 may be provided on the light supplying sheet 220. The light emitting devices 221 provided on the light supplying sheet 220 may supply light to the liquid crystal panel 210.

The reflective layer 230 may be provided under the light supplying sheet 220. For instance, the reflective layer 230 may include at least one selected from the group consisting of W, ITO, Cr, Al and Ag. The reflective layer 230 may be provided with a separate layer, and may be formed on a bottom surface of the light supplying sheet 220 through deposition or coating. The reflective layer 230 may reflect light emitted from the light emitting devices 221 to the liquid crystal display panel 210.

As described above with reference to FIGS. 2 and 3, the light supplying sheet 220 may include the support member 127, the transparent conductive layer 123 provided on the support member 127, and the light emitting devices 121 provided on the transparent conductive layer 123. The support member 127 may include a flexible substrate. The support member 127 may include transparent glass or plastic. The transparent conductive layer 123 may include a transparent conductive oxide layer.

The light emitting device 221 may include a light emitting diode. The light emitting device 221 may be connected through a flip-chip scheme. In addition, the light emitting device 221 may be connected through a die-bonding scheme or a wire bonding scheme.

The light emitting device 221 may include a red light emitting device, a green light emitting device, or a blue light emitting device. The light emitting device 221 may include a white light emitting device. Accordingly, the light emitting device 121 may include a light emitting device to emit light in a ultra-violet band.

The liquid crystal panel 210 may be attached to the light supplying sheet 220 by using an attaching unit 240. For instance, the attaching unit 240 may be selected from the group consisting of a silicon adhesive, an epoxy adhesive and a tape.

The resin member 250 may be disposed between the liquid crystal panel 210 and the light supplying sheet 220. The resin member 250 may be transparently realized by using epoxy or silicon. When the resin member 250 is provided, the attaching unit 240 may be provided between the resin member 250 and the liquid crystal panel 210.

The resin member 250 may include phosphor. The phosphor receives light emitted from the light emitting device 221 to emit light in which a wavelength band is changed. The phosphor contained in the resin member 250 may be selected from the group consisting of red phosphor, green phosphor, blue phosphor, and yellow phosphor.

In this case, if light to be supplied to the liquid crystal panel 210 from the light supplying sheet 220 is white light, and if the light emitting device 221 is a blue light emitting device, phosphor to emit yellow light can be selected. The type of the light emitting device 221 and the type of the phosphor contained in the resin member 250 may vary according to the wavelength bands of light to be supplied.

According to the LCD of the embodiment, a backlight unit has no need to be additionally manufactured. In addition, the light supplying sheet 220 may supply light to the liquid crystal panel 210 to display an image. The light supplying sheet 220 may be directly attached to the liquid crystal panel 210 by using the attaching unit 140. The light supplying sheet 220 may have the thickness in the range of about 0.25 mm to about 0.35 mm. Therefore, the thickness from the bottom surface of the light supplying sheet 220 to the bottom surface of the liquid crystal panel 210 may be about 0.5 mm or less.

An optical sheet may be disposed between the light supplying sheet 220 and the liquid crystal panel 210 if necessary. The optical sheet may include a diffusion sheet, a prism sheet, or a DBEF (Dual Brightness Enhancement Film)

Figure 6:
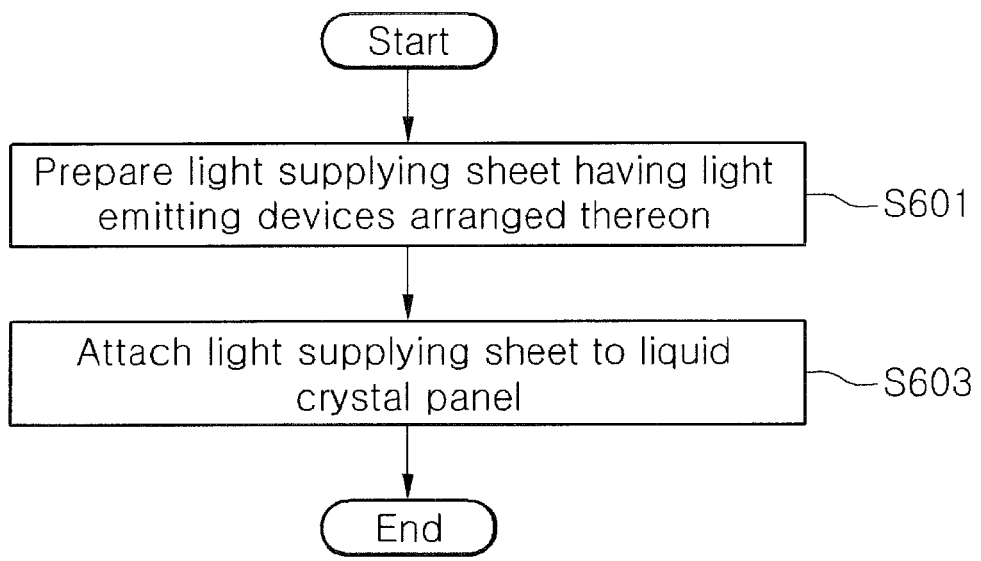
FIG. 6 is a view showing a method of manufacturing the liquid crystal display according to the embodiment of the present invention.

FIG. 6 is a flowchart showing a method of manufacturing the LCD according to the embodiment.

Hereinafter, the method of manufacturing the LCD according to the embodiment will be described with reference to FIGS. 1 to 6. After preparing the light supplying sheet 120 in which a plurality of light emitting devices 121 are arranged (step S601), the light supplying sheet 120 is attached to the liquid crystal panel 110 (Step S603).

The step of preparing the light supplying sheet 120 in which the light emitting devices 121 are arranged includes a step of forming the transparent conductive layer 123 on the support member 127 and a step of providing the light emitting devices 121 on the transparent conductive layer 123. The transparent conductive layer 123 may include a transparent conductive oxide layer.

The light emitting device 121 may be connected to the transparent conductive layer 123 through a flip-chip scheme. The transparent conductive layer 123 may supply power to the light emitting device 121, and may be patterned on the support member 127 in a predetermined shape. The light emitting device 121 may be connected to the transparent conductive layer 123 by a bump 125.

The light emitting device 121 may be connected to the transparent conductive layer 123 through a die-bonding scheme or a wire-bonding scheme. The light emitting device 121 may be selected from the group consisting of red, green, blue, and white light emitting devices.

A step of forming the reflective layer 130 including at least one selected from the group consisting of W, ITO, Cr, Al and Ag on the light supplying sheet 120 may be further formed. For instance, the reflective layer 130 may be formed before or after the transparent conductive layer 123 is formed on the support member 127.

The step of attaching the light supplying sheet 120 onto the liquid crystal panel 110 can be realized by providing the attaching unit 140, which includes one selected from the group consisting of a silicon adhesive, an epoxy adhesive and a tape, between the light supplying sheet 120 and the liquid crystal panel 110.

As described above with reference to FIG. 5, a step of disposing the resin member 250 including phosphor between the liquid crystal panel 210 and the light supply sheet 220 may be further realized.

The resin member 250 may be transparently realized by using epoxy or silicon. When the resin member 250 is provided, the attaching unit 240 may be provided between the light supplying sheet 220 and the liquid crystal panel 210. Phosphor may be contained in the resin member 250. The phosphor receives light emitted from the light emitting device 221 to emit light in which a wavelength band is changed. The phosphor contained in the resin member 250 may be selected from the group consisting of red phosphor, green phosphor, blue phosphor, and yellow phosphor.

In this case, if light to be supplied to the liquid crystal panel 210 from the light supplying sheet 220 is white light, and if the light emitting device 221 is a blue light emitting device, phosphor to emit yellow light may be selected. The type of the light emitting device 221 and the type of the phosphor contained in the resin member 250 may vary according to the wavelength bands of light to be supplied.

According to the LCD of the embodiment, a backlight unit has no need to be additionally manufactured. In addition, the light supplying sheet 120 may supply light to the liquid crystal panel 110 to display an image. The light supplying sheet 120 may be directly attached to the liquid crystal panel 110 by using the attaching unit 140. The light supplying sheet 120 may have the thickness in the range of about 0.25 mm to about 0.35 mm. Therefore, the thickness from the bottom surface the support member 127 of the light supplying sheet 120 to the bottom surface of the liquid crystal panel 110 may be about 0.5 mm or less.

An optical sheet may be disposed between the light supplying sheet 120 and the liquid crystal panel 110 if necessary. The optical sheet may include a diffusion sheet, a prism sheet, or a DBEF (Dual Brightness Enhancement Film).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display apparatus comprising:
   a support member;
   a plurality of semiconductor light-emitting devices on the support member;
   a display panel on the support member for displaying an image;
   a resin member between the support member and the display panel; and
   an attaching unit between the support member and the display panel, and the attaching unit contacts the resin member.

2. The image display apparatus of claim 1, wherein the support member includes one of glass and plastic.

3. The image display apparatus of claim 1, wherein the attaching unit includes at least one selected from the group consisting of a silicon adhesive, an epoxy adhesive and a tape.

4. The image display apparatus of claim 1, wherein the resin member includes phosphor.

5. The image display apparatus of claim 1, further comprising:
   a transparent conductive layer on the support member to electrically connect the support member to the semiconductor light emitting devices.

6. The image display apparatus of claim 5, wherein the transparent conductive layer is formed of a transparent conductive oxide material.

7. The image display apparatus of claim 1, wherein the support member is a flexible substrate.

8. The image display apparatus of claim 1, wherein the semiconductor light emitting devices include at least one selected from the group consisting of red, green, blue, white, and UV light emitting devices.

9. The image display apparatus of claim 1, further comprising:
   a reflective layer under the support member.

10. The image display apparatus of claim 1, wherein the display panel includes a liquid crystal panel.

11. The image display apparatus of claim 1, wherein a thickness from a bottom surface of the support member to a bottom surface of the display panel is approximately 50 µm to 0.5 mm.

12. The image display apparatus of claim 1, further comprising:
   an optical sheet between the support member and the display panel.

13. An image display apparatus comprising:
   a support member;
   a plurality of semiconductor light-emitting devices on the support member;
   a resin on the support member and on the plurality of semiconductor light-emitting devices;
   a display panel on the resin for displaying an image; and
   an attaching unit to attach the support member and the display panel, and the attaching unit to directly contact the resin.

14. The image display apparatus of claim 13, wherein the support member includes one of glass and plastic.

15. The image display apparatus of claim 13, wherein the attaching unit includes at least one selected from the group consisting of a silicon adhesive, an epoxy adhesive and a tape.

16. The image display apparatus of claim 13, wherein the resin includes phosphor.

17. The image display apparatus of claim 13, further comprising:
a transparent conductive layer on the support member to electrically connect the support member to the semiconductor light emitting devices.

18. The image display apparatus of claim 13, wherein the support member is a flexible substrate.

19. The image display apparatus of claim 13, wherein a thickness from a bottom surface of the support member to a bottom surface of the display panel is approximately 50 μm to 0.5 mm.

20. An image display apparatus comprising:

a support member having a top surface;

a plurality of semiconductor light-emitting devices on the support member;

a resin on the support member and on the plurality of semiconductor light-emitting devices;

a liquid crystal display panel on the resin for displaying an image, the liquid crystal display panel having a top surface and a bottom surface; and an attaching unit to attach the top surface of the support member to the bottom surface of the liquid crystal display panel, and the attaching unit to contact the resin.

* * * * *